United States Patent
Lang et al.

(10) Patent No.: US 12,196,321 B2
(45) Date of Patent: Jan. 14, 2025

(54) SELF-SUCTIONING MECHANICAL SEAL ASSEMBLY

(71) Applicant: EagleBurgmann Germany Gmbh & Co. KG, Wolfratshausen (DE)

(72) Inventors: Klaus Lang, Eurasburg (DE); Thomas Zauner, Pullach (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 17/911,731

(22) PCT Filed: Jan. 26, 2021

(86) PCT No.: PCT/EP2021/051731
§ 371 (c)(1),
(2) Date: Sep. 15, 2022

(87) PCT Pub. No.: WO2021/190803
PCT Pub. Date: Sep. 30, 2021

(65) Prior Publication Data
US 2023/0114474 A1   Apr. 13, 2023

(30) Foreign Application Priority Data
Mar. 24, 2020 (DE) .................... 10 2020 203 767.1

(51) Int. Cl.
*F16J 15/34* (2006.01)
*F16J 15/40* (2006.01)

(52) U.S. Cl.
CPC ............. *F16J 15/342* (2013.01); *F16J 15/40* (2013.01)

(58) Field of Classification Search
CPC ...... F16J 15/34; F16J 15/3404; F16J 15/3412; F16J 15/3416; F16J 15/342
See application file for complete search history.

(56) References Cited

U.S. PATENT DOCUMENTS

| 4,645,414 A | 2/1987 | DeHart et al. |
| 5,133,562 A * | 7/1992 | Lipschitz ............... F16J 15/342 |
| | | 277/408 |

(Continued)

FOREIGN PATENT DOCUMENTS

| DE | 2444544 A1 | 4/1976 |
| DE | 3619489 A1 | 12/1987 |

(Continued)

OTHER PUBLICATIONS

International Search Report issued in PCT/EP2021/051731, dated May 4, 2021.

*Primary Examiner* — Gilbert Y Lee
(74) *Attorney, Agent, or Firm* — Locke Lord LLP; Scott D. Wofsy

(57) ABSTRACT

The invention relates to a mechanical seal assembly comprising a slide ring seal (2) having a rotating slide ring (3) with a first slide surface (30) and a stationary slide ring (4) with a second slide surface (40), a sealing gap (5) being defined between the first and second slide surfaces, the stationary slide ring (4) having a through hole (42) extending from a rear side (41) of the stationary slide ring to an orifice (43) of the second slide surface (40) and a gas supply line (8) extending from a gas source to an inlet (44) of the through hole (42) at the rear side of the stationary slide ring, wherein grooves (6, 7) are formed in at least one of the sliding surfaces (30, 40), the grooves being arranged in radial direction between the orifice (43) of the through hole (42) and a radially outer outlet portion (50) of the sealing gap (5).

8 Claims, 2 Drawing Sheets

(56) References Cited

U.S. PATENT DOCUMENTS

Figure 1:
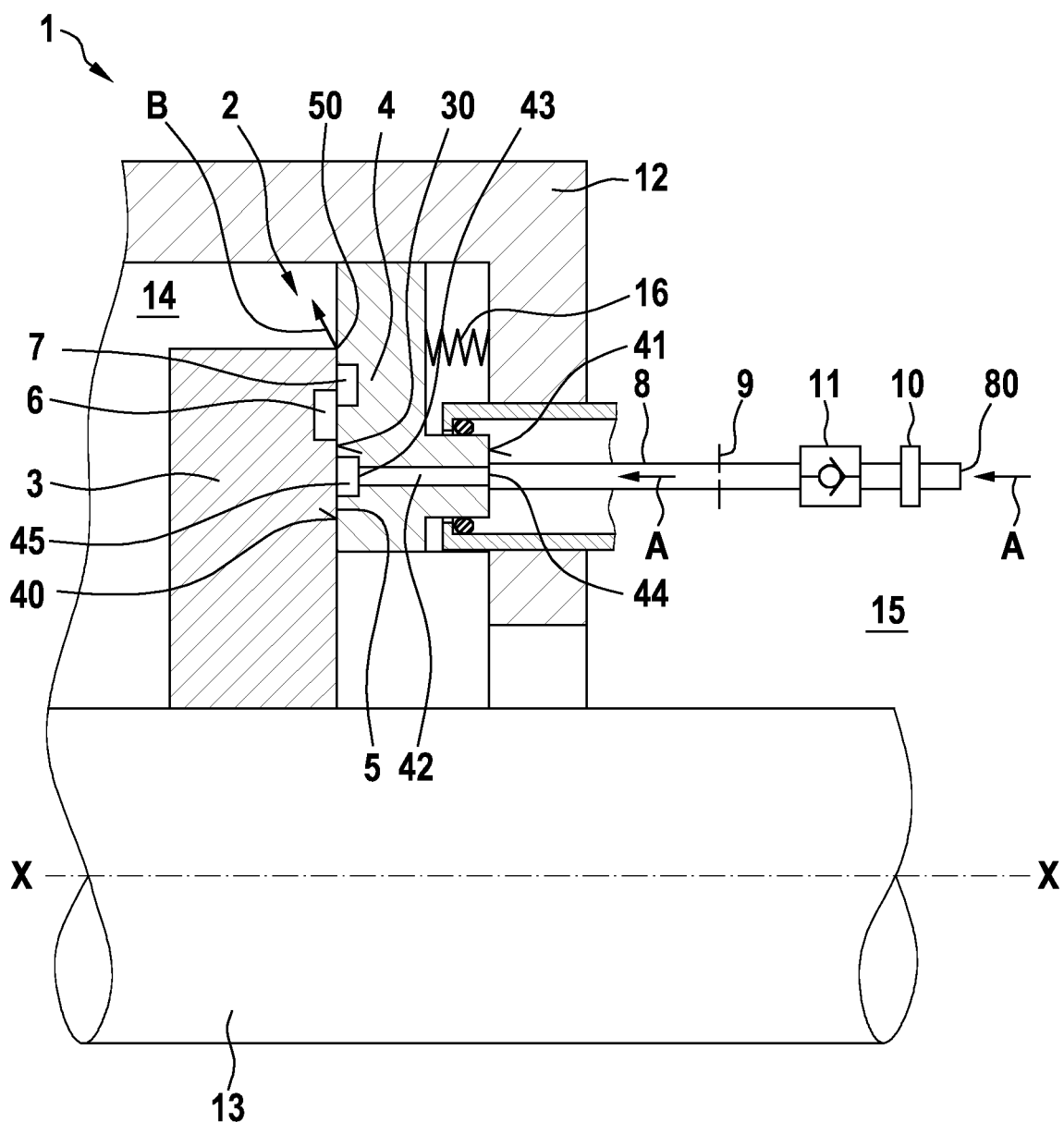

| | | | | |
|---|---|---|---|---|
| 6,557,856 B1* | 5/2003 | Azibert | ................ | F16J 15/3488 |
| | | | | 277/408 |
| 7,044,470 B2* | 5/2006 | Zheng | .................. | F16J 15/3448 |
| | | | | 277/408 |
| 7,726,659 B2* | 6/2010 | Fujiwara | .............. | F16J 15/3448 |
| | | | | 277/408 |
| 2001/0010416 A1* | 8/2001 | Wu | ...................... | F16J 15/3488 |
| | | | | 277/408 |
| 2020/0347726 A1* | 11/2020 | Høeg | ................. | F04C 15/0007 |
| 2021/0207715 A1* | 7/2021 | Werdecker | ........... | F16J 15/3404 |

FOREIGN PATENT DOCUMENTS

| | | | | |
|---|---|---|---|---|
| DE | 102015226444 A1 * | 6/2017 | | |
| EP | 3318784 A1 | 5/2018 | | |
| JP | H05196148 A | 8/1993 | | |
| JP | H08303606 A | 11/1996 | | |
| WO | WO-2008052231 A1 * | 5/2008 | ............ | F03B 11/006 |

\* cited by examiner

SELF-SUCTIONING MECHANICAL SEAL ASSEMBLY

CROSS-REFERENCE TO RELATED APPLICATIONS

This application is a U.S. National Phase Application filed under 35 U.S.C. § 371, based on International Patent Application No. PCT/EP2021/051731, filed Jan. 26, 2021, which claims priority to German Patent Application No. 10 2020 203 767.1, filed on Mar. 24, 2020, which are incorporated herein by reference.

The present invention relates to a self-suctioning mechanical seal assembly which can independently aspirate a barrier gas, in especially air.

Mechanical seal assemblies are known from prior art in various configurations. A common mode of operation for mechanical seal assemblies is to provide a so-called "barrier gas device" which provides a barrier gas for sealing at the sealing gap. The sealing gas has a slightly higher pressure than a pressure of the medium to be sealed, which prevents leakage through the sealing gap of the medium to be sealed due to the pressure difference with respect to the sealing gas. However, such sealing gas devices are additional components, thus increasing both capital expenditure and operation of the mechanical seal assembly. On the other hand, such sealing gas devices provide particularly reliable sealing of the mechanical seal assembly. Frequently, however, in the case of sealing gas devices, the mechanical seal assembly is also required to comprise a second mechanical seal, resulting in what is known as a "tandem design". However, a large number of applications exist in which, for the reasons of cost and/or installation space, such a tandem design with a sealing gas device is not feasible, for example in the automotive sector.

It is therefore the object of the present invention to provide a mechanical seal assembly which allows omitting a sealing gas device and which nevertheless includes a sealing gas in the sealing gap for sealing a liquid medium, considering the design thereof and being simple and inexpensive to manufacture.

This object will be achieved by a mechanical seal assembly having the features of the independent claim, the subclaims showing preferred further embodiments of the invention.

The mechanical seal assembly according to the invention having the features of claim 1 has the advantage that a sealing gas can independently be aspirated. This means that the cost of such a mechanical seal assembly can be kept very low, thus enabling use of mechanical seals in a wide field, especially also in automotive applications. According to the invention, this will be achieved by the mechanical seal assembly comprising a mechanical seal including a rotating slide ring and a stationary slide ring. The rotating slide ring has a first sliding surface and the stationary slide ring has a second sliding surface. A sealing gap is defined between the sliding surfaces. The stationary slide ring further comprises a through hole extending from a rear side of the stationary slide ring to the second sliding surface. Thus, the through hole connects the rear side of the stationary slide ring to its sliding surface. Furthermore, a gas supply line is provided which extends from an atmospheric side to the orifice of the through hole at the rear side of the stationary slide ring, providing a gas-carrying connection between the sliding surface of the stationary slide ring and the atmosphere side. Furthermore, at least one of the two sliding surfaces of the slide rings comprises grooves for gas conveyance. The grooves are arranged in the radial direction of the slide ring between an orifice of the through hole and a radially outer outlet region of the sealing gap to the medium to be sealed. Thus, in operation, when relative rotation occurs between the rotating slide ring and the stationary slide ring, a gaseous medium, preferably air, is aspirated into the sealing gap through the gas supply line and the through hole in the stationary slide ring. The grooves in at least one of the sliding surfaces of the slide rings thus generate an appropriate suction pressure for aspirating the gas through the through hole and the gas supply line and increase the pressure of the medium in the sealing gap in the direction of the outlet region to the medium to be sealed. Thus, a barrier gas supply to the mechanical seal assembly is no longer required. As a result, both the operating costs and the investment costs for such a mechanical seal assembly can be significantly reduced. The mechanical seal assembly has a very simple and inexpensive design still enabling a medium in a product region to be reliably sealed from an atmospheric region. Simultaneously, the mechanical seal assembly according to the invention does not even require a compressor or the like, since the barrier fluid for the sealing gap is automatically aspirated.

Preferably, grooves are arranged in both the first sliding surface and the second sliding surface of the slide rings. This may allow faster aspiration of the gas through the gas supply line and through hole. Furthermore, grooves in both sliding surfaces can also provide a higher pressure level in the sealing gap during operation.

Further preferably, the second sliding surface of the stationary slide ring comprises a circumferential annular groove, with the through hole leading into the circumferential annular groove. As a result, the gas aspirated at the sealing gap is distributed in the circumferential direction by the circumferential annular groove, so that uniform pressure build-up in the sealing gap is realized. This has advantages both when starting the mechanical seal from a standstill state and in continuous operation.

Further preferably, the mechanical seal assembly comprises a throttle which is arranged in the gas supply line. The throttle enables selective restriction of a flow rate of the gas that is drawn to the sealing gap. The throttle is preferably adjustable. Particularly preferably, the throttle is a perforated disc.

According to another preferred embodiment, the mechanical seal assembly comprises a filter which is arranged in the gas supply line. The filter prevents dirt particles or dust or the like from reaching the sealing gap via the gas supply line and the through hole. The filter can be made of a wide variety of materials. Preferably, the filter is arranged directly at an intake region of the gas supply line.

Further preferably, a check valve is provided in the gas supply line. The check valve is arranged such that gas can flow through the gas supply line in the direction of the through hole, but is prevented from flowing back. This prevents unwanted gas flow through the gas supply line and the through hole, especially in the event of a mechanical seal shutdown.

Further preferably, the grooves in the sliding surfaces are arranged such that a circumferentially closed sliding surface region between a radially outermost region of the grooves and an outer circumferential edge of the slide ring always exists. This ensures reliable sealing effect, especially when the mechanical seal is in a standstill state, since groove-free sliding surface regions are then always available on both sliding surfaces adjacent to the outer radial circumference, which regions bear against each other when the seal is in a standstill state, thus enabling improved sealing.

Preferably, foot regions of the first grooves are located on a first radius R1 and head regions of the first grooves are located on a second radius R2. Foot regions of the second grooves are located on a third radius R3 and head regions of the second grooves are located on a fourth radius R4. Herein, the first radius R1 is smaller than the third radius R3, wherein the second radius R2 is larger than the third radius R3, and wherein the fourth radius R4 is larger than the second radius R2. Thus, R1<R3<R2<R4 will apply. This ensures that there is only an annular overlap region between the first and second grooves, in which the grooves face each other. Radially below and radially above the overlap region, there are respective regions where the groove regions are located opposite a sliding surface of the opposite slide ring.

The mechanical seal assembly according to the invention is preferably a gas seal for sealing a gaseous medium from an atmosphere.

Figure 2:
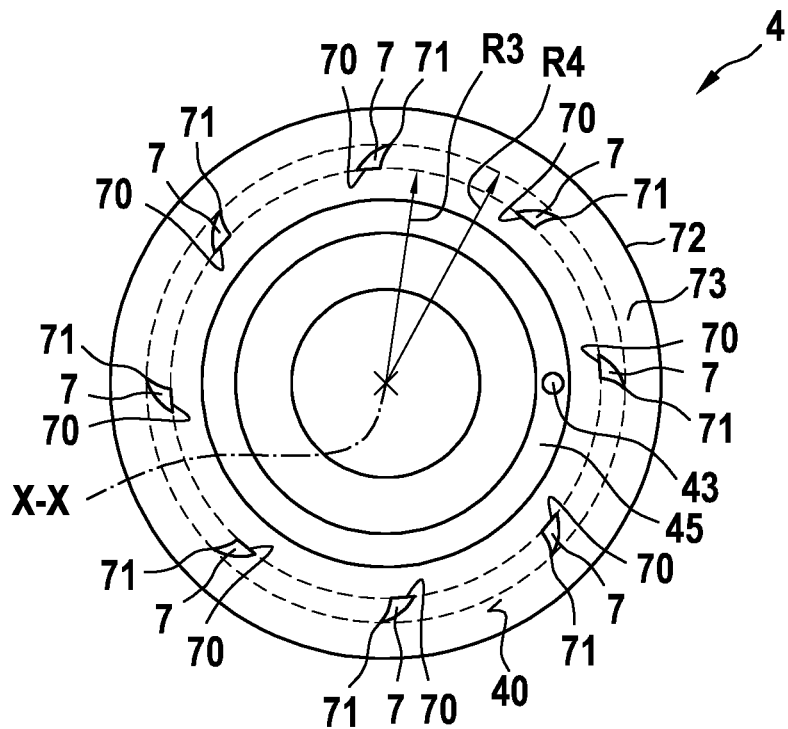
Figure 3:
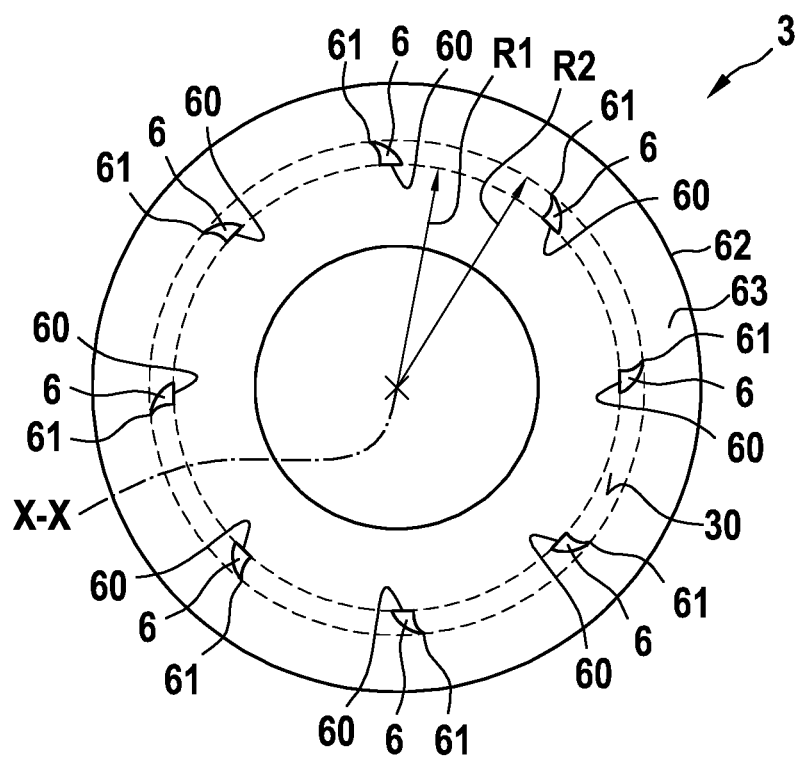

A preferred embodiment of the invention is described in detail below with reference to the accompanying drawing, wherein:

FIG. 1 is a schematic sectional view of a mechanical seal assembly according to a preferred embodiment of the invention, FIG. 2 is a schematic top view of a sliding surface of a stationary slide ring of the mechanical seal assembly of FIG. 1, and FIG. 3 is a schematic top view of a sliding surface of a rotating slide ring of the mechanical seal assembly of FIG. 1.

Hereinafter, referring to FIGS. 1 to 3, a mechanical seal assembly 1 according to a preferred embodiment of the invention will be described in detail.

The mechanical seal assembly 1 comprises a mechanical seal 2 having a rotating slide ring 3 and a stationary slide ring 4. The rotating slide ring 3 comprises a first sliding surface 30 and the stationary slide ring 4 comprises a second sliding surface 40. A sealing gap 5 is defined between the two sliding surfaces 30, 40.

The mechanical seal 2 seals a product region 14 from an atmosphere region 15.

The rotating slide ring 3 is non-rotatably connected to a shaft 13. The stationary slide ring 4 is connected to a housing 12. The stationary slide ring 4 is axially movable and is pretensioned using a pretensioning device 16.

As may be seen from FIG. 1, the stationary slide ring 4 further comprises a through hole 42. The through hole 42 connects a rear side 41 of the stationary slide ring 4 to the second sliding surface 40 of the stationary slide ring 4.

Furthermore, the mechanical seal assembly 1 comprises a gas supply line 8. The gas supply line 8 is arranged to supply a gas from a gas source to the through hole 42. In this embodiment the gas is air taken from the atmosphere. The gas supply line 8 has an inlet 80 and extends to an inlet 44 of the through hole 42 at the rear side 41 of the stationary slide ring.

As may be seen further from FIG. 1, an orifice 43 of the through hole 42 is arranged in the stationary slide ring 4 at a circumferential annular groove 45. The through hole 42 is formed linearly and parallel to an axial direction X-X of the stationary mechanical seal 2. The annular groove 45 is formed completely circumferentially in the second sliding surface 40.

Thus, a fluid connection between the atmosphere region 15 and the sealing gap 5 exists through the gas supply line 8 and the through hole 42 in the stationary slide ring 4.

As may further be seen from FIG. 1, the mechanical seal assembly 1 further comprises a throttle 9 which is arranged in the gas supply line 8. In this example embodiment, the throttle 9 is a perforated disc.

In addition, a check valve 11 is arranged in the gas supply line 8. The check valve 11 prevents gas from flowing back from the sealing gap 5 or the through hole 42 back to the atmosphere region 15.

Furthermore, a filter 10 is provided which prevents dust particles or the like from entering the sealing gap 5 from the atmospheric region 15.

Furthermore, first grooves 6 are provided in the first sliding surface 30 of the rotating slide ring 3 and second grooves 7 are provided in the second sliding surface 40 of the stationary slide ring 4. The sliding surfaces including the grooves may be seen in detail in FIGS. 2 and 3.

FIG. 2 shows a top view of the second sliding surface 40 of the stationary slide ring 4. Herein, the circumferential annular groove 45 may be seen in detail, into which the orifice 43 of the through hole 42 opens. Radially outside the annular groove 45 the second grooves 7 are arranged. The second grooves 7 are provided in a crescent shape and have a foot portion 70 and a head portion 71. A plurality of second grooves 7 are arranged in the circumferential direction with equal distances from adjacent grooves on an equal radius, respectively. As can further be seen from FIG. 2, a circumferential second sliding region 73 is provided between the head regions 71 of the second grooves 7 and an outer circumferential edge 72.

The through hole 42 is formed in a straight line and extends parallel to an axial direction X-X of the mechanical seal.

FIG. 3 shows a top view of the first sliding surface 30 of the rotating slide ring 3 with the first grooves 6. The first grooves 6 are crescent-shaped and have a foot region 60 and a head region 61. Thus, a circumferential first slide region 63 is formed between the head region 61 and an outer circumferential edge 62 of the rotating slide ring 3. Thus, the first grooves 6 do not extend to the outer peripheral edge of the rotating slide ring 3. The first slide region 63 and the second slide region 73 thus form a sealing dam with respect to the product region 14 when the slide ring seal 2 is in a standstill state, thereby substantially preventing leakage through the sealing gap 5 to the atmosphere region 15 when the slide ring seal is in a standstill state. Similarly, a sealing dam is formed with respect to the atmosphere region 15 radially inside the circumferential annular groove 45 on the sliding surfaces.

As may be seen from a comparison of FIGS. 2 and 3, the first crescent-shaped grooves 6 and the second crescent-shaped grooves 7 are curved in a mutually crossed manner. As may further be seen from FIG. 1, the first grooves 6 and the second grooves 7 are further arranged on different radii, starting from a center line of the mechanical seal 2. This enables gradual pressure build-up when the mechanical seal 2 starts up.

As may be seen from FIG. 3, the foot regions 60 of the first grooves 6 are located on a first radius R1. The head regions 61 are located on a second radius R2.

The foot regions 70 of the second grooves 7 are located on a third radius R3 and the head regions 71 of the second grooves 7 are located on a fourth radius R4 (cf. FIG. 2).

As may be seen from FIGS. 1, 2 and 3, the first radius R1 is smaller than the third radius R3. Furthermore, the second radius R2 is larger than the third radius R3. The fourth radius R4 in turn is larger than the second radius R2. Thus R1<R3<R2<R4 will apply. This ensures overlapping of the grooves 6, 7 in the radial direction only at a partial region of the sliding surfaces.

A depth of the first grooves 6 is equal to a depth of the second grooves 7.

This enables gradual pressure build-up during rotation of the rotating slide ring 2 in the sealing gap 5.

The relative rotation between the rotating slide ring 3 and the stationary slide ring 4 generates a vacuum in the region of the annular groove 45 and thus also in the region of the through hole 42, so that air is aspirated through the filter 10 and via the check valve 11 and through the throttle 9 into the gas supply line 8. It is therefore possible for the mechanical seal 2 to aspirate the sealing medium in the sealing gap 5 itself during operation. This means that any complex sealing gas supply, which is required in prior art, can be omitted. Air is continuously aspirated during operation, as indicated by the arrows A in FIG. 1. In the sealing gap, the aspirated air is then used as a sealing medium and is radially outwards conveyed through the first and second grooves 6, 7 toward the product region 14. This is indicated in FIG. 1 by the arrow B. In this process, the pressure of the barrier gas is increased to a value greater than the pressure of the medium to be sealed.

Thus, the invention can provide a self-suctioning mechanical seal assembly 1 which aspirates a gas during operation by itself. As a result, there is no need to provide a complex sealing gas supply for the mechanical seal assembly 1. The gas to be aspirated is preferably air. It should be noted, however, that a separate gas reservoir with a gas specific to a particular application, for example nitrogen, can of course also be provided, from which reservoir gas is aspirated to the sealing gap 5 via the gas supply line 8. If necessary, the gas reservoir must be continuously refilled with further gas so as not to allow an impermissible negative pressure in the gas reservoir.

It should also be noted that in an alternative embodiment of the invention a filter 10 is designed such that it is exclusively arranged in the gas supply line 8. In this case, in addition to the filter function, the filter 10, for example, in addition has a throttle function preventing impermissible backflow of gas through the gas supply line 8 back to the inlet 80. Further alternatively, only a throttle 9, for example in the form of a variable and/or closable pinhole, can also be provided in the gas supply line 8, allowing a pressure of the aspirated gas to be adjusted. By completely closing the perforated plate, any undesired backflow of gas from the sealing gap 5 in the direction of the inlet 80 of the gas supply line 8 can also be prevented.

LIST OF REFERENCE NUMBERS

1 Mechanical seal assembly
2 Mechanical seal
3 Rotating slide ring
4 Stationary slide ring
5 Sealing gap
6 First grooves
7 Second grooves
8 Gas supply line
9 Throttle
10 Filter
11 Check valve
12 Housing
13 Shaft
14 Product region
15 Atmosphere region
16 Pretensioning device
30 First sliding surface
40 Second sliding surface
41 Rear side of stationary slide ring
42 Through hole in stationary slide ring
43 Orifice of through hole
44 Inlet of through hole
45 Annular groove in second sliding surface
50 Outlet region
60 Foot region
61 Head region
62 Outer circumferential edge of rotating slide ring
63 First sliding region
70 Foot region
71 Head region
72 Outer circumferential edge of the stationary slide ring
73 Second slide region of stationary slide ring
80 Inlet of gas supply line
A Supply into the gas supply line
B Exit of sealing gas from sealing gap
R1 First radius
R2 Second radius
R3 Third radius
R4 Fourth radius
X-X Axial direction

The invention claimed is:

1. A self-suctioning mechanical seal assembly comprising:
a mechanical seal including a rotating slide ring having a first sliding surface and a stationary slide ring having a second sliding surface, a sealing gap being defined between the first and second sliding surfaces, the stationary slide ring having a through hole extending from a rear side of the stationary slide ring to an orifice of the second sliding surface, and a gas supply line extending from a gas source to an inlet of the through hole at the rear side of the stationary slide ring, wherein grooves are formed in at least one of the sliding surfaces, the grooves being arranged in the radial direction between the orifice of the through hole and a radially outer outlet region of the sealing gap, and further comprising a throttle arranged in the gas supply line, a filter arranged in the gas supply line, and a check valve arranged in the gas supply, wherein the filter, the check valve, and the throttle are arranged in the gas supply line in that order in a supply direction.

2. The self-suctioning mechanical seal assembly according to claim 1, wherein first grooves are formed in the first sliding surface and second grooves are formed in the second sliding surface.

3. The self-suctioning mechanical seal assembly according to claim 2, wherein the first grooves are arranged offset in relation to the second grooves in the radial direction of the mechanical seal.

4. The self-suctioning mechanical seal assembly according to claim 3, wherein foot regions of the first grooves are located on a first radius R1 and head regions of the first grooves are located on a second radius R2, wherein foot regions of the second grooves are located on a third radius R3 and head regions of the second grooves are located on a fourth radius R4 wherein the first radius R1 is smaller than the third radius R3, wherein the second radius R2 is larger than the third radius R3, and wherein the fourth radius R4 is larger than the second radius R2.

5. The self-suctioning mechanical seal assembly according to claim 1, wherein an annular groove is formed in the second sliding surface of the stationary slide ring, wherein the through hole opens into the annular groove.

6. The self-suctioning mechanical seal assembly according to claim 1, wherein the throttle is adjustable to vary a gas flow through the throttle.

7. The self-suctioning mechanical seal assembly according to claim 1, wherein the throttle is a perforated disc.

8. The self-suctioning mechanical seal assembly according to claim 1, wherein the grooves are arranged on the sliding surfaces such that a groove-free sliding region is present between a head region of the grooves and an outer peripheral edge of the slide rings.

* * * * *